July 25, 1933.  T. B. MUNROE ET AL  1,920,129
FIBER STORAGE AND PRESERVATION
Filed June 11, 1930   3 Sheets-Sheet 1
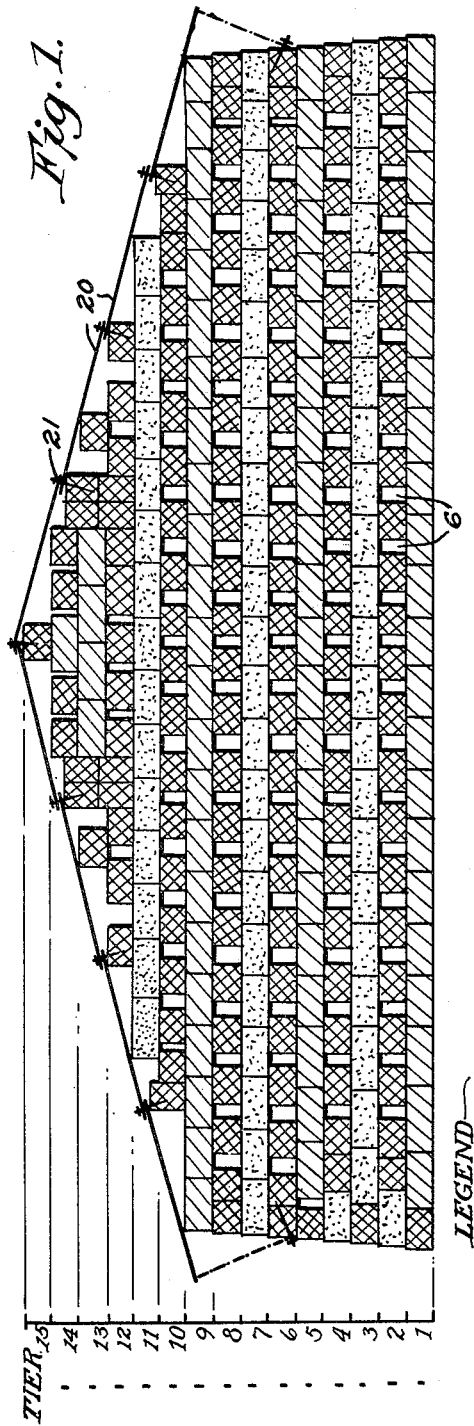
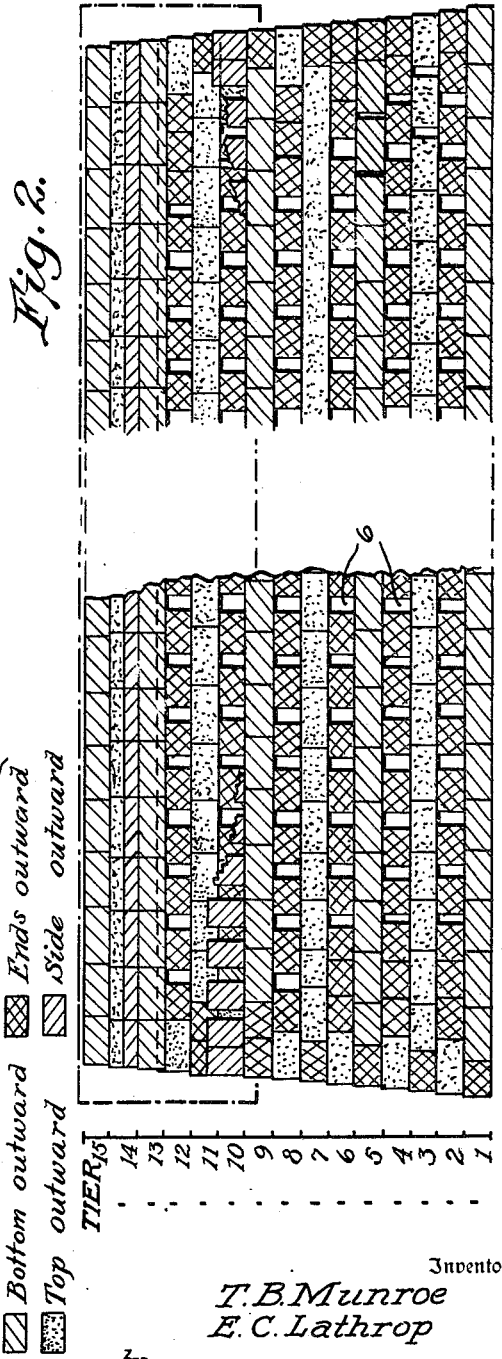
Inventors
T. B. Munroe
E. C. Lathrop
by
Attorney July 25, 1933.　　　T. B. MUNROE ET AL　　　1,920,129
FIBER STORAGE AND PRESERVATION
Filed June 11, 1930　　3 Sheets-Sheet 2
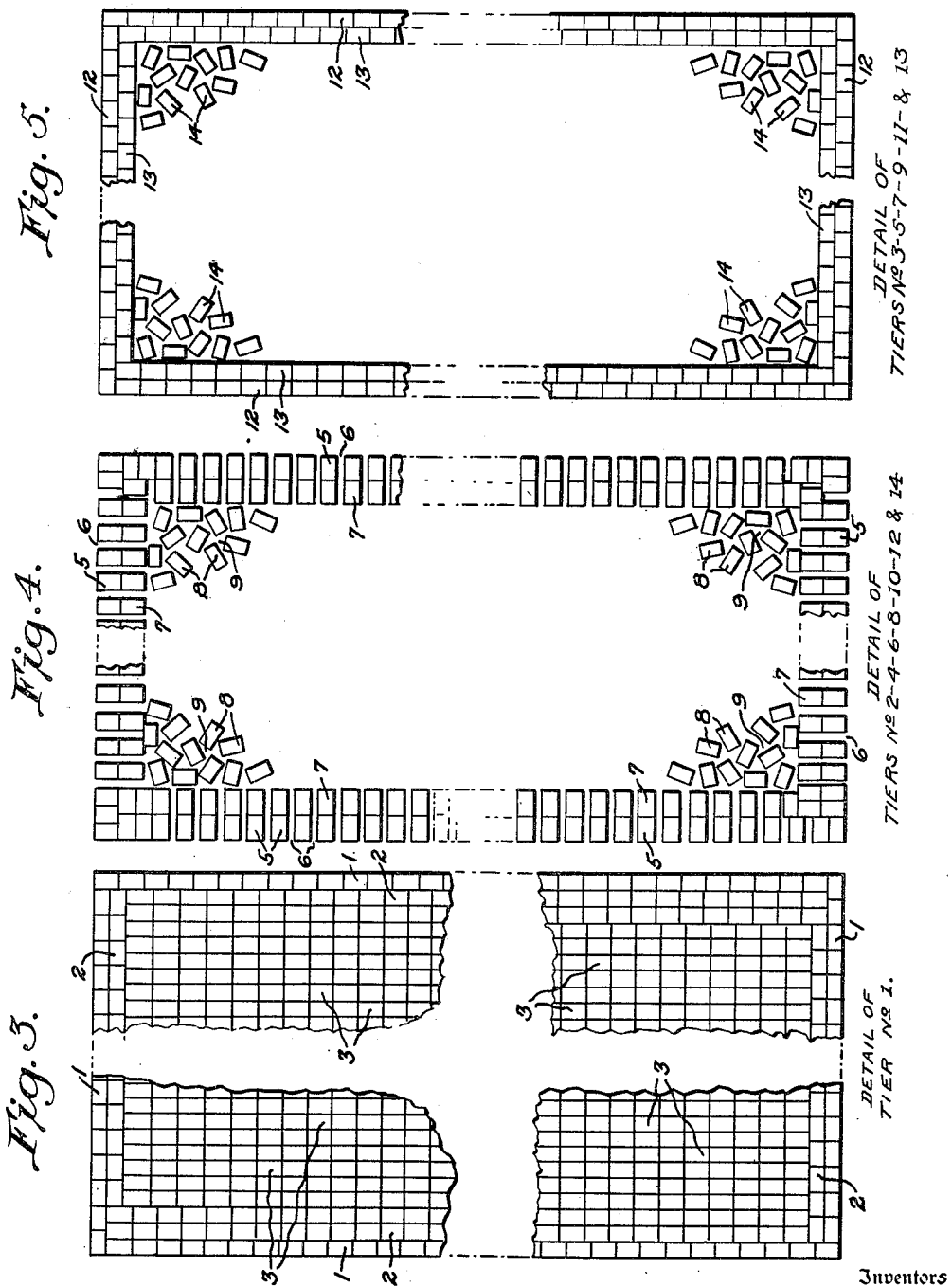
Inventors
T. B. Munroe
E. C. Lathrop
By
Attorney July 25, 1933.   T. B. MUNROE ET AL   1,920,129
FIBER STORAGE AND PRESERVATION
Filed June 11, 1930   3 Sheets-Sheet 3
Fig. 6.
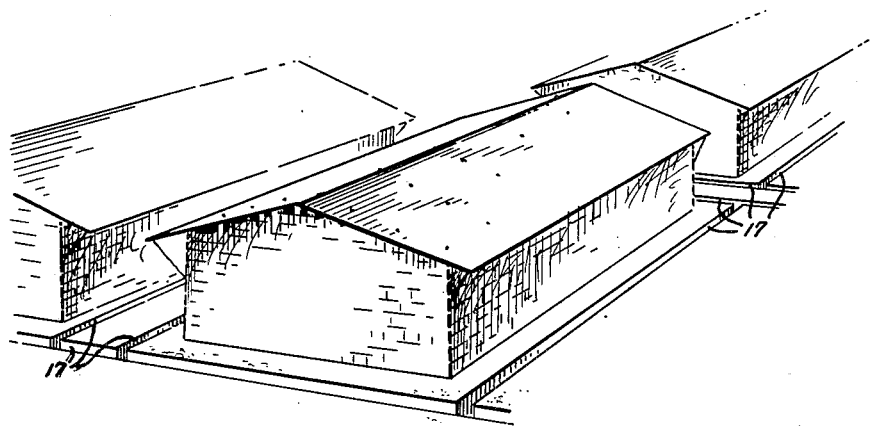
Fig. 7.
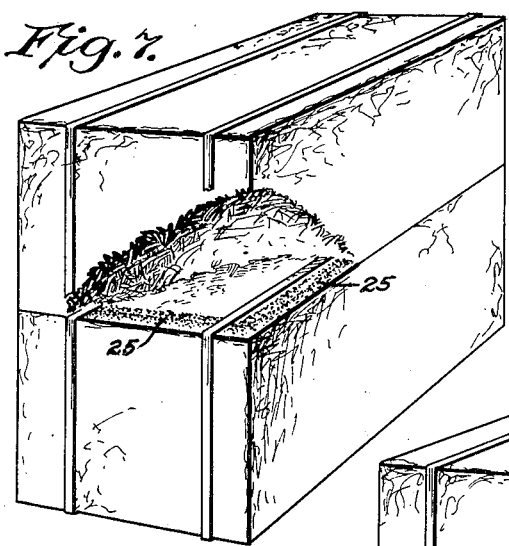
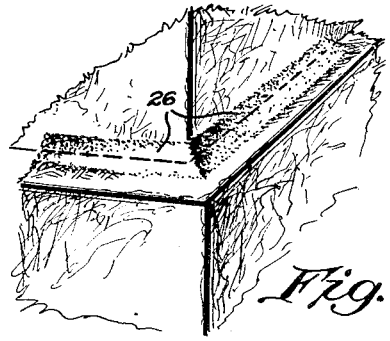
Fig. 9.
Fig. 8.
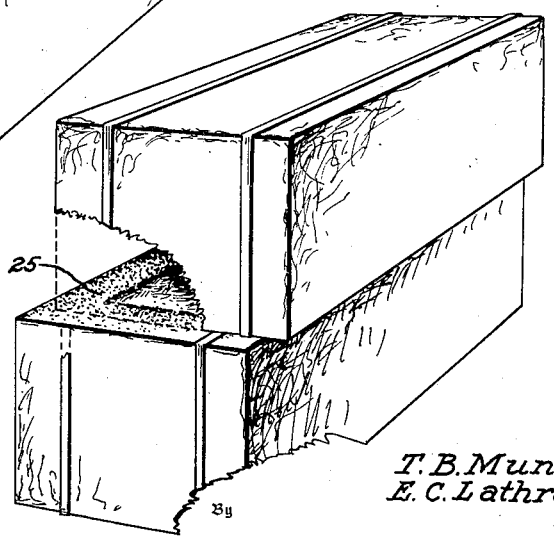
Inventors
T. B. Munroe
E. C. Lathrop
Attorney Patented July 25, 1933

1,920,129

UNITED STATES PATENT OFFICE

TREADWAY B. MUNROE AND ELBERT C. LATHROP, OF CHICAGO, ILLINOIS, ASSIGNORS TO THE CELOTEX COMPANY, OF CHICAGO, ILLINOIS, A CORPORATION OF DELAWARE

FIBER STORAGE AND PRESERVATION

Application filed June 11, 1930. Serial No. 460,533.

This invention relates to the storage and preservation of various products of vegetation, including bagasse, corn stalks, wood, etc., and in fact to the storage and preservation of substantially any wood or woody growth having a moisture content of about 30 to 40% or more.

The various plants, wood, etc., are composed almost entirely of cellulose lignin, pentosans, sugars, gums, and water, and practically all have a water content of 30 to 40% or more unless the growth is dead and has been allowed to dry out. If vegetative materials having about 30 to 40% or more water content are gathered in mass, then under usual conditions there will be quickly set up enzymic and yeast fermentations which involve first and particularly any sugars present, but which in general will, if unchecked, eventually involve substantially the entire mass.

Vegetative materials to be used in papermaking, the manufacture of insulating board, and the like, or any other use, involving the utilization of the materials as such must be protected from deleterious fermentation which will injure the fiber or destroy its value, and the mass must also be protected from injurious fungus growth which in its life processes may destroy or consume the materials thereof. The method of mass preservation must not only afford protection from fermentation initially, but must also afford continuous protection, since, even though initial fermentation may be prevented or checked before damage is done to the material, fermentation may again set in or fungi may be propagated in the mass if the moisture content rises to that necessary for the life processes of fermentation or for the growth of fungi.

In the development of this particular process of storage, which was specifically developed for the storage of raw fibrous vegetative materials in large masses, considerable difficulty was encountered from an economic standpoint. For example, it is obvious that if the material, dried to a moisture content say of 15% to 20%, is subsequently placed in waterproof storage, there will be no difficulty in its preservation, or if there is admixed with the material sufficient bactericide and fungicide then the fermentations and fungus growth can be prevented. Preliminary drying with fully protected storage or the addition of sufficient inhibiting substance, while possible with small quantities of material where cost is not important, is prohibitive in cases where great masses are handled under conditions which necessitate low costs of equipment, materials, handling charges, etc., in order that the storage and preservation costs may be kept within allowable limits.

The process of storage and preservation herein set out is one wherein a tremendous amount of time has been spent in investigations and in connection with which experiments of immense magnitude have been carried on to develop a feasible plan for fiber storage and preservation. The experimental work of development has been carried on primarily in connection with the storage and preservation of sugar cane bagasse, the fibrous residue from milling of sugar cane, which is available in a fresh condition and in large quantities only annually, and the process hereinafter set out is that process which has been determined as the result of several years' experience as complete for the preservation of the materials and as one which is commercially feasible from the economic standpoint.

The methods of preservation and storage hereinafter set out in detail have decreased the loss in the storage of bagasse from more than 25% to consistently under 10%, and ordinarily to under 5%. While the major portion of the development of the described method of storage has been carried out in connection with the storage and preservation of bagasse, it has been determined that other raw materials, such as hay, corn stalks, and the like, having in general more or less similar constituents with a relatively high moisture content, may be stored and preserved by this same process.

According to this invention, advantage is taken of the heat generated by fermentation within a pile of material, whereby this heat developed in the exothermic reaction of fermentation is utilized to partially dry out the mass, that is, by allowing fermentation (alcoholic, lactic, and acetic) with the attendant production of heat and under predetermined conditions, a portion of the mass, principally the sugars, are more or less converted into alcohol, acetic acid, and lactic acid, and possibly other fermentation products. The method employed, though, is such that the fermentations are stopped before the destructive fermentations set in which will consume the fiber constituents of the material stored.

The various raw materials having a sufficient moisture content to support the life processes of fermentation, that is, having a moisture content of about 35% or more if placed in piles, will quickly start to ferment, and heat will be generated. By placing the materials in large piles having a relatively great volume with respect to the exposed surface area, the heat which is generated quickly warms up the interior of the same, and in fact in large piles, if this heat is uncontrolled, sufficient may be generated to cause scorching or burning of the interior of the pile and, furthermore, unless controlled, there is no appreciable tendency for the center of the mass to dry, even though it is appreciably heated, since the interior will be protected from evaporation by the exterior layers of the pile. In order that the material in the pile may not scorch or burn, the pile is formed in a definite arrangement whereby ventilating channels are provided which allow escape of heat, not necessarily as such, and in fact primarily the heat is dissipated in evaporating the moisture from the mass, which moisture escapes as vapor from the ventilating channels.

The heat generated by the fermentation within the mass also serves an additional purpose to that of evaporating this moisture therefrom in that, while during the initial fermentation moisture is removed from the interior of the mass, the mass as a whole is heated by the heat liberated by the life processes of the micro-organisms of fermentation. The fermentations which occur can continue only in the presence of moisture, and then only when there is water present in excess of a minimum amount, which amount by weight is about 30% to 35% of that of the fiber. The heating of the piles and the reduction of the moisture content through heat generated by the fermentation and the utilization thereof as described has a cumulative action in that each tends to slow down the life processes of the micro-organisms of fermentation until finally the heat at the low moisture content, and, concurrently, the low moisture content at the elevated temperature, produces a substantial pasteurization of the mass, whereby further fermentations are inhibited.

Up to this point there has been described the handling of the material under what may be stated to be controlled and predetermined conditions, and if from this point the material can be maintained without any or without substantial change, there will be no difficulty involved in its preservation. The difficulty which arises is the economic difficulty of providing the means for maintaining the condition. The storage of 100,000 tons of bagasse, dry fiber weight, requires a space approximately one-quarter mile square, even though the bagasse is compressed to a density of approximately 100 pounds per cubic foot and is formed into piles 30 feet high, there being provided of course necessary aisleways in said area for piling, unpiling, fire protection, etc. To completely cover a storage space such as just mentioned would necessitate the erection of a structure of some 2,500,000 square feet roof area with a clear height of about 40 feet, but the upkeep of such a structure would be a very large item, and the necessary columns, roof girders, and the like, would very appreciably complicate the matter of handling the material into the piles and from the piles. The necessity for a structure of any such tremendous size as described is obviated by the extension to their ultimate of the principles as already set out, and the accomplishment thereof is as follows.

The material to be stored is formed wet as it comes from the sugar mill into bales which, when subsequently formed into the pile, may be placed in the sides of the pile in truly vertical arrangement, or the outer row of bales vertically may be arranged in slightly stepped relation, so that a slight amount of the top of each outer bale is exposed beyond the bottom edge of the superposed bale.

If the sides of the pile are erected truly vertically, there is applied along the top surface of each exterior bale, close to the exterior edge thereof, a supply or reservoir of bactericide and/or fungicide, which will inhibit fermentations and the growth of fungi. If the sides of the pile are stepped, then the inhibiting substance is applied to the exposed top portions of the bales so as to be adjacent the exposed contacting edges of the bales, and extends preferably somewhat under the outer edge of the superposed bale. The material applied between or adjacent the exposed contacting edges of the bales should be water soluble, and its function is to be dissolved by and carried into the pile by such moisture as may enter at the exposed contacting edges of the bales, and which will by capillarity tend to spread back between the contacting bale faces into the pile.

Now, as the bales are of sufficient density that the exposed side faces of the pile will not be wet to any appreciable depth by the rains, and means have been described for protection from water which may through capillarity tend to pass back into the pile between contacting faces of adjacent outside bales, there remains to be described only the pile top protection in order that the entire method of preservation may be fully disclosed. The top of the pile may preferably be protected by erecting thereon a protecting roofing, which is preferably of sheet iron formed into portable sections. In order that the pile covering may be applied economically, the top portions of the piles are formed with a stepped arrangement with respect preferably to the longer sides of the piles to form a direct support for a peaked roof. The portable roof sections with a water-shedding overlap are then laid on the top of the pile and may be secured in any convenient manner, such as by long corkscrew-like pins thrust into the underlying bales, whereby the roof sections are prevented from being blown off the pile by wind.

It can readily be seen from the preceding that there has been generally described a method of preservation of vegetative materials having a relatively high initial water content, particularly for the subsequent utilization of the fiber thereof, wherein through controlled fermentation of the material in piles the mass thereof is relatively dried out and brought to a state of equilibrium or quiescense and is subsequently maintained in such condition, to the end that further and harmful fermentation and decomposition is prevented.

In the accompanying drawings, Fig. 1 is an end elevation of a completed pile; Fig. 2 is a side elevation partly broken away of the pile shown in Figure 1, the roof being indicated by outline only, for the sake of clearness; Figs. 3, 4 and 5 represent the bale arrangement in the pile respectively in the bottom tier, in the even numbered tiers, and in the odd numbered tiers; Fig. 6 is a perspective view showing the disposition of adjacent piles and drainage ditches; Fig. 7 illustrates the application of preservative when the outer bales are piled truly vertical; Fig. 8 illustrates the application of the preservative when the outer bales are piled in stepped formation; and Fig. 9 illustrates a mode of application modified somewhat from that shown in Figure 8.

In piling the material it is, of course, advisable to pick a somewhat elevated, level, but slightly crowned and well-drained site, and it is advisable, if possible, to have a base of a few inches of gravel or the equivalent. If the piles are to be erected recurrently on some particular location, it may be feasible to install concrete bases, but this is optional, the primary consideration being the provision of a base which shall tend to transmit the minimum of surface waters to the bottom of the pile.

The raw material must be erected in piles of considerable volume, with the exposed surface area having a low ratio relative to the volume of the mass. There has been selected as a convenient pile area the dimensions 66' x 100', but these dimensions are, of course, subject to variation. For instance, the pile may be 85' x 85' with but a very slight modification of the ventilating arrangement, or the pile may be 40' x 150' and, further, such dimensions are only approximate since a 5' or even a 10' deviation is not necessarily fatal to proper preservation. If the proportion of surface area to volume is increased, the ventilation of the pile should accordingly be decreased, or as area to volume is decreased the ventilation is to be increased.

The material to be preserved, whether bagasse, uncured hay, corn stalks, etc., should be densely compressed into bales of a size convenient for handling and piling. The dimensions of the bales are not in any way critical, but a rather high density bale is relatively essential and by all means is more convenient than a low density bale. By having the bales of a high density, rain which may be driven against the exposed sides of the bales penetrates only superficially and is readily evaporated by the succeeding sunshine and winds. Bales of bagasse having dimensions of about 17" x 22" x 32", and each compressed to a weight of about 250 pounds, have been found to be quite satisfactory. Such bales are of convenient size, and after drying out during the storage and preservation period each will weigh about 125 pounds and be easily handled.

In erecting the pile of material the bottom or first tier is placed on the base in regular order in close contact to form a firm pile bottom. In building the first tier, see Fig. 3, chalk lines are stretched between established corner stakes on the ground, and a row 1 of bales is laid lengthwise along each line. A second row 2, likewise with bottom outward, is then preferably laid closely contacting the outside row, after which the center of the tier is filled with bales as at 3, keeping them in rows as close together as possible to secure a substantially solid foundation for the pile. No air space is intentionally left between the bales of the tier, since sufficient cooling effect is gained from the ground and the air spaces provided in the superposed tiers. The subsequent piling, so far as concerns the exposed face of the pile, may be alternatively arranged as shown in Figs. 7 and 8, that is the bales of the sides may be piled vertically flush or they may be stepped. The piling proceeds as follows:

In constructing the second tier or layer, see Fig. 4, a chalk line is again stretched around the sides of the pile but held in place by pins driven into the bales of the first tier. This second layer of bales is erected upon the first layer in such manner that numerous tunnel-like ventilating ducts may be formed to communicate from the exterior of the pile into the interior thereof. The bales in the external row 5 of this layer are preferably turned to have their long dimension extending in the direction from the exterior to the interior of the pile, in other words these bales are placed with their ends outward, and between adjacent bales the spacing 6 of approximately one-half the width of a bale is allowed. A second row 7 of bales in this layer is preferably arranged immediately behind the exterior row, the bales of this second row being positioned in the same arrangement as in the outer row, whereby there are provided distinct ventilating openings opening from the exterior of the pile into the interior thereof. The remaining bales of this second layer within the confines of said second row are arranged in random relation indicated at 8, that is in such arrangement that there are left between the bales numerous vertical channels 9, care being taken that these random laid bales all lie in the plane of the second tier and have no greater than line contact, whereby each bale will be substantially freely open around its sides for the circulation of air therearound and thereover.

In constructing the third layer, see Fig. 5, a chalk line is stretched in the same manner as for the second layer. This third layer has the exterior row 12 of bales thereof preferably turned with their long dimension in the plane of the face of the pile, in other words the bales of this outer row are placed with their tops outward, said bales arranged in end to end contact. A second row 13 of bales is similarly arranged and contacting the bales of the exterior row, and the remaining bales of this third layer within the confines of said second row are arranged in random relation as at 14 in the same manner as was described above for the arrangement of the interior bales of the second layer. The bales of the two exterior rows 12 and 13, it will therefore be seen, are laid transversely of the bales upon which they were superposed and in end to end contact, thereby creating a tie in the surface structure of the pile.

The bales in the fourth tier as well as those in the succeeding even numbered tiers are arranged in the same general relation as those of the second tier, that is with their ends outwardly except perhaps at the corners where one or two bales are placed top outward to insure a good solid corner. Further, the fifth and succeeding odd numbered tiers are arranged in the same general relation as those in the third tier with the following exceptions. In the third, seventh and eleventh tiers all bales are piled with their tops outward, whereas in the fifth, ninth and thirteenth tiers all bales are piled with their bottoms outward, as will be apparent from the indications shown in Figs. 1 and 2 with particular reference to the accompanying legend. It may sometimes become necessary to place a bale differently than called for in the balance of the tier in order to start the joints breaking properly, but after this is accomplished every bale must break the joint below it and be placed according to said figures.

The important feature in the piling of the bales is to construct a corner having the greatest strength possible, and to then pay strict attention to the piling in the two outside rows in all tiers to establish a tied and firm outer wall in the pile to prevent toppling or bulging which might subsequently cause a collapse of the pile. The alternation from bales tops outward in some tiers, to bales bottoms outward in other tiers is quite important due to the fact that the tops and bottoms have different densities. This is caused, in forming the bale, by the material having the tendency to pack at the bottom of the charge chamber in the baler, and sometimes each charge is not completely full and, while the bale assumes its full dimension, namely 17" x 22" x 32", the top might be quite soft while the bottom of the bale will always be exceedingly dense and hard.

It will be seen that in accordance with the construction which has just been described the pile will present a relatively solid and rigid exterior shell having extended therethrough numerous tunnel-like ventilating openings 6 communicating from the exterior face thereof into the interior of the pile, which interior portion comprises a multitude of bales having surface contact only on their top and bottom faces, thus establishing throughout the interior of the pile a porous and air-permeable construction due to the random arrangement of the bales providing a multitude of disconnected vertical passages throughout the mass thereof.

The piles of material are advantageously built nine layers high, according to the arrangement heretofore described, and from this point upwards, although the layers have substantially the arrangement as previously described, they are narrowed in one dimension whereby the top portion of the pile is formed with appreciable receding steps to the end that the top portion of the pile will serve as a supporting structure on which can be erected a peaked roof. It is not thought that it is necessary to describe the specific construction of the upper stepped-back portion of the pile, since an arrangement thereof is clearly shown in Figure 1, which arrangement will vary somewhat, as is readily understood, depending upon the points at which support is desired for the superposed roof structure.

The pile, of course, can be carried up full width for, say, fifteen layers without being stepped back to provide a peaked top, serving as a foundation for a protecting roof, and a structural support for a covering roof may be erected on top of the pile. Drainage ditches 17 are provided around each pile, being spaced from the sides thereof about six feet.

The roof as shown on the pile comprises sheet iron panels 20 about 10′ square which are laid on the top of the pile in edge-overlapping relation and are secured thereto by long pins 21 which extend through the sheet covering and anchor into the underlying bales, as is clearly shown in Figure 1. Of course, any other type of roof covering can be used, but the one just mentioned is very convenient in that the sections can be readily removed in order that the pile may be torn down, and in building a pile such roof is not in the way during the erection as it is placed on the pile after the pile has been erected.

As has been described, the function of the collection of a large mass of the material into the piles is to provide a method of piling wherein, due to exothermic reactions, the moisture content of the pile as a whole is lowered to that below which the life processes of the organisms of fermentation can not continue; in other words, due to the heat developed, the pile is dried down to a moisture content in the neighborhood of 25–35% by weight. Since, if the exterior of the pile becomes wet due to precipitative moisture such as rain or the like, the moisture content will be again raised to a point at which fermentations may set in, it has been found that the sides of the pile must be afforded protection.

The protection to be afforded to the sides of the pile is not protection of the exterior vertical bale faces, since rain which may wet these faces is readily dried out by ensuing winds and sunshine, due to the fact that the bales are compressed to sufficient density that such moisture will not appreciably penetrate. The difficulty which arises is that, due to the nature of the contacting bale faces of superposed bales, there is a tendency for precipitated moisture which lodges adjacent the contacting faces of these bales to be drawn into the pile between these faces through capillarity, which moisture after it passes back into the pile from the face thereof is not readily evaporated by winds and the sun, since it is protected from the action thereof. Further, if such moisture is in any appreciable amount, it will, due to the laminated form of the bales which formation is the normal bale structure, be drawn through capillarity down into the bale between the laminations thereof. This added moisture raises the moisture content of the material to a point above the minimum for the life processes of organisms of fermentation, and fermentations may be set up.

In order to obviate the deleterious effects of moisture absorbed into the pile through capillarity as has just been described, there is provided preferably during the construction of the pile reservoirs of fungicide and/or bactericide. These reservoirs of material are positioned adjacent the exposed contacting edges of superposed bales, whereby such moisture prior to its passing into the pile between contacting bale faces thereof is caused to dissolve some of this preservative material which it then carries into the bale with it, and which is carried in to the same extent that the moisture penetrates, whereby such moisture when it penetrates carries with it substances to offset its deleterious effects.

During the erection of the pile it is convenient to add the desired fungicide or bactericide by distributing it in an application indicated at 25 covering about the outer 4″ along the outer top surface of the exteror bales of each layer prior to the placement of the next succeeding layer thereon, which application of preservative material is illustrated in Figs. 7 and 8. In Fig. 7 the application is illustrated as applied to a flush or straight sided pile, whereas in Fig. 8 the application is shown as it would be made to a pile in which the exterior tier faces are slightly stepped back. Alternatively, and probably not quite as efficiently, in a stepped back pile the preservative material may be deposited merely on the top of the exposed portion of the exterior rows of bales, but in such application care should be taken to see that the preservative is applied directly at the exposed contacting edges of the contacting faces of the superposed bales, which application of protective material is illustrated at 26 in Fig. 9 and on short exposed edges amounts to about 0.17 to 0.2# per bale and along long edges is about 0.35 to 0.4# per bale.

In order that the top of the pile may be protected from any rain which might beat in between the edges of the roof sections or beat up under the edges of the roof or find entry through holes and the like, it is advisable to distribute over the top surface of a pile a preservative which is to be substantially uniformly distributed over the exposed top bale surfaces. Boric acid has been found to be a very satisfactory fungicide and bactericide for use in this connection but, of course, any preservative which is sufficiently water-soluble and is of the desired toxicity may be substituted therefor. By treating the piles with the preservative in the manner described, it has been found that a pile 100' long, 66' wide and 25' high can be fully protected by the application of 1¾ barrels of boric acid to the sides and 1¼ barrels of boric acid to the top, or about 800# total per pile. If other toxic agents are used in place of the boric acid, the quantity, of course, will be substantially in direct proportion to the toxicity thereof compared with boric acid.

By the use of a dry fungicide or toxic agent as has been described, it is possible to provide a preservative in a manner which does not add to the total moisture content of the stored material, whereby due to such higher moisture content it would be more difficult to lower the final moisture content to a point below that necessary for the life processes of organisms of fermentation, yet by using a soluble, dry toxic agent as has been described, applied in the form of the reservoirs, it is possible to apply it at the exact points where it will be needed and in such a form that it will be used up only in proportion to the amount of moisture which tends to penetrate at any particular point.

It will be seen from the preceding description that the greater part of the mass of material in effect causes its own preservation in that by utilizing the phenomena of the fermentation of certain portions thereof the pile, through its particular arrangement, is caused to generate sufficient heat to reduce its moisture content and to substantially pasteurize the fiber of the interior portions thereof. In effect substantially the entire procedure for the preservation of the fibrous material comprises the planned utilization of natural phenomena under controlled conditions and the subsequent maintenance of conditions which are brought about by the utilization of these phenomena in the planned manner.

It is obvious that those skilled in the art may vary the details of construction and arrangement of the bales in the pile, as well as the steps and combinations of steps of the method of preserving the baled mass, without departing from the spirit of this invention, and therefore it is not desired to be limited to the foregoing disclosure except as may be demanded by the claims.

What is claimed is:

1. A pile of fermentable, fibrous, vegetative material having dimensions in the order of 66' x 100' x 25', the pile formed of densely baled material having an initial moisture content of 25% or over, the bales arranged substantially in layers, the interior bales of the pile in an arrangement whereby vertical sides of bales contact adjacent bales at vertical corner edges only, thereby providing interiorly of the pile multitudinous, non-continuous vertical flues, the exterior bales of the pile erected in relatively ordered arrangement and having elements thereof separated and providing ventilating ducts opening from the exterior of the pile into the interior thereof, adjacent bales of the exterior surface of the pile having applied adjacent exteriorly exposed lines of contact a reservoir of fungicide, the pile as a whole having a protecting covering whereby the top surface thereof is protected from direct precipitation of moisture.

2. A pile of fermentable, fibrous, vegetative material having dimensions in the order of 66' x 100' x 25', the pile formed of densely baled material having an initial moisture content of 25% or over, the bales arranged substantially in layers, the interior bales of the pile in an arrangement whereby vertical sides of bales contact adjacent bales at vertical corner edges only, thereby providing interiorly of the pile multitudinous, non-continuous vertical flues, the exterior bales of the pile erected in relatively ordered arrangement and having elements thereof separated and providing ventilating ducts opening from the exterior of the pile into the interior thereof, the ventilating ducts being in substantially regular arrangement, and the area thereof comprising approximately 20% of the exterior side surfaces of the pile, adjacent bales of the exterior surface of the pile having applied adjacent exteriorly exposed lines of contact a reservoir of a dry fungicide, the pile as a whole having a protecting covering whereby the top surface thereof is protected from direct precipitation of moisture.

3. A pile of fibrous, vegetative material comprising a mass in the order of 10,000 bales of relatively densely compressed sugar cane bagasse, the bales arranged in horizontal layers and comprising a base layer with subsequent layers arranged thereon alternately as follows, one of the alternate layers having its exterior bales spaced and providing ventilating channels communicating from the exterior into the interior of the pile, the interior bales of the layer in random arrangement with vertical line contact only, the other of the alternate layers having the exterior bales thereof in face contact, the interior bales in random arrangement and having vertical line contact only.

4. A pile of fibrous, vegetative material comprising a mass in the order of 10,000 bales of relatively densely compressed sugar cane bagasse, the basis arranged in horizontal layers and comprising a base layer with subsequent layers arranged thereon alternately as follows: one of the alternate layers having its exterior bales spaced and providing ventilating channels communicating from the exterior into the interior of the pile, the interior bales of the layer in random arrangement with vertical line contact only, the other of the alternate layers having the exterior bales thereof in face contact, the interior bales in random arrangement and having vertical line contact only, the ventilating channels of the exterior of the pile into the interior thereof constituting about 20% of and distributed in substantially regular order throughout the side surfaces of the pile.

5. A pile of fermentable, fibrous, vegetative material having dimensions in the order of 66' x 100' x 25', the pile formed of densely baled material having an initial moisture content of 25% or over, the bales arranged substantially in layers the interior bales of the pile in an arrangement whereby vertical sides of bales contact adjacent bales at vertical corner edges only, thereby providing interiorly of the pile multitudinous, non-continuous vertical flues, the exterior bales of the pile erected in relatively ordered arrangement and having elements thereof separated and providing ventilating ducts being in substantially regular arrangement, and the area thereof comprising approximately 20% of the exterior side surfaces of the pile, adjacent bales of the exterior surface of the pile having applied adjacent exteriorly exposed lines of contact a reservoir of dry boric acid, the top of the pile having dry boric acid applied thereto at the rate of approximately 0.03 pounds per square foot, the pile as a whole having a protecting covering whereby the top surface thereof is protected from direct precipitation of moisture.

TREADWAY B. MUNROE.
ELBERT C. LATHROP.